United States Patent [19]
Hall et al.

[11] Patent Number: 6,115,124
[45] Date of Patent: Sep. 5, 2000

[54] METHOD FOR MEASUREMENT OF PNR BIAS ERROR IN AN INTERFEROMETRIC FIBER OPTIC GYROSCOPE (IFOG)

[75] Inventors: John R. Hall, Woodland Hills; Edward Kanegsberg, Pacific Palisades, both of Calif.

[73] Assignee: Litton Systems, Inc., Woodland Hills, Calif.

[21] Appl. No.: 09/209,507

[22] Filed: Dec. 10, 1998

[51] Int. Cl.⁷ .................................................. G01K 19/72
[52] U.S. Cl. ............................................................ 356/350
[58] Field of Search ............................................. 356/350

[56] References Cited

U.S. PATENT DOCUMENTS

| | | | |
|---|---|---|---|
| 4,869,592 | 9/1989 | Bergh | 356/350 |
| 4,881,817 | 11/1989 | Kim et al. | 356/350 |
| 5,037,205 | 8/1991 | Pavlath | 356/350 |

*Primary Examiner*—Samuel A. Turner
*Attorney, Agent, or Firm*—Price Gess & Ubell

[57] ABSTRACT

A method for measuring intensity-type polarization non-reciprocity (PNR) bias error in an interferometric fiber optic gyroscope (IFOG) using birefringence modulation. The counter-propagating waves in the fiber optic loop of the IFOG are modulated with a slowly varying voltage signal, such as a triangle wave, ramp or sine wave signal, to cause birefringence modulation. A peak-to-peak amplitude of a resultant output signal is measured to determine the intensity-type PNR bias error of the IFOG.

19 Claims, 2 Drawing Sheets

METHOD FOR MEASUREMENT OF PNR BIAS ERROR IN AN INTERFEROMETRIC FIBER OPTIC GYROSCOPE (IFOG)

BACKGROUND OF THE INVENTION

1. Field of the Invention

The present invention relates generally to the field of interferometric fiber optic gyroscopes (IFOGs), and more particularly, to a method for measuring an intensity-type polarization non-reciprocity (PNR) bias error in an IFOG.

2. Description of Related Art

As discussed in U.S. Pat. No. 4,881,817, herein incorporated by reference, a fiber optic gyroscope typically comprises a single loop of optical fiber, which has a pair of light waves coupled to travel in opposite directions around the loop. If the loop is rotated, the counter-propagating light waves experience a phase-shift due to the well-known Sagnac effect. By detecting a phase difference between the two light waves caused by the Sagnac effect, the rotation rate of the loop can be determined.

FIG. 1 is a graph illustrating how the Sagnac effect can be used to determine the rotation rate of a fiber loop. An interferometer is used to measure a phase difference $\phi$ between the counter-propagating waves. The observable output power is given by the following equation:

$$P = P_o/2(1 + \cos \phi)$$

where $P_o$ is the nominal input power. If the phase difference $\phi$ is zero, then $P = P_o$, and the loop is stationary. However, as the loop is rotated, the Sagnac effect causes the phase to shift by $\Omega$. Notice, that at $\phi = \Omega$, the value of P is only slightly less than $P_o$. Thus, measuring the phase shift around $P = P_o$ is difficult.

One technique used to overcome this problem recognizes that at $\phi = +/- \pi/2$, the slopes of the cosine function are at a maximum and are of opposite sign. If the light waves are modulated with a square wave signal having a period of $\tau$ microseconds, where r is the time it takes the light waves to travel around the loop, the phase of the output signal can be shifted to $+/- \pi/2$. If the loop is also rotating, an additional phase shift is present, which causes the phase shift to be slightly greater than $\pi/2$ in one direction (point $a_2$), and slightly less than $\pi/2$ in the other direction (point $a_1$). The phase shift component caused by rotation can be determined by measuring the difference between the minimum $a_1$ and maximum $a_2$ output power levels, denoted by A in FIGS. 1 and 2.

FIG. 2 is a graph of the output power versus time. If the loop is not rotating, and no other effects are considered, the output power resulting from the square wave modulation would be a constant $P_o/2$ (line 200). As a result of the rotation, however, the output is a square wave (line 202), having an amplitude A. This signal is then demodulated using a photodetector to calculate the amplitude A. This amplitude value A is proportional to the phase shift $\Omega$. The phase shift is likewise proportional to the rotation rate. Thus, the rotation rate of a fiber loop can be determined.

If the optical path lengths around the loop are equal for both counter-propagating waves, the interferometer is said to be "reciprocal." However, in practice, most fiber interferometers are not reciprocal, due to imperfections in optical fibers. Most commercially available optical fibers are birefringent (i.e. doubly refractive), resulting in two different orthogonal polarization modes, each mode propagating light at a different velocity. In addition, birefringence of the optical fibers is sensitive to environmental factors such as temperature, pressure, strain, etc. Thus, practical interferometers are known as being "non-reciprocal," since birefringence causes counter-propagating waves to travel different optical path lengths around the loop, resulting in a phase difference between the waves, even if the loop is at rest. One type of error induced by the difference in polarization between the two paths is known as intensity-type polarization non-reciprocity (PNR) bias error.

The birefringence-induced phase difference (PNR bias error) is a major source of error in fiber optic gyroscopes. In fact, the error can be on the same order of magnitude as the Sagnac effect itself, or even larger. Moreover, the PNR bias error is not constant over time, and is therefore difficult to actually eliminate. One solution to reduce the PNR bias error is to use special polarizing fiber to reduce coupling between the polarization modes. During the manufacturing process, the special polarizing fiber is subjected to mechanical stresses to increase the birefringence of the fiber. This reduces coupling between the modes, since the high birefringence tends to preserve the polarization of the light waves. However, even using the special polarization-preserving fiber, the PNR bias error is still a factor.

U.S. Pat. No. 4,881,817, noted above, teaches a device for minimizing PNR bias error in a fiber optic gyroscope. Essentially, the device forces the PNR error to occur all the time by using a relatively fast modulation. If the error is known to occur, it can be averaged out over time and effectively eliminated. However, this disclosure does not teach any method or device for actually measuring the amount of PNR bias error present in a particular fiber optic loop. A method for measuring the PNR bias error present in a fiber optic loop is needed for use in manufacturing environments, where certain physical parameters may be adjusted to minimize the error while the loop is still in assembly.

One known technique for measuring PNR bias error is to vary the temperature of the loop, and measure the resulting PNR bias error. Since the birefringence cross-coupling is temperature dependent, the loop can be placed into an industrial oven, and the PNR bias error measured for different temperatures. If the results over the measured temperature range (typically 50° C.–150° C.) are unacceptable, the loop may be rejected or corrective action taken. This process takes several hours, however, and is difficult to use on an assembly line.

Thus, there is a need for a method which can accurately determine the amount of intensity-type PNR bias error in a relatively short period of time, without heating and/or cooling the fiber optic loop.

SUMMARY OF THE INVENTION

The present invention is a method for measuring intensity-type polarization non-reciprocity (PNR) bias error in an interferometric fiber optic gyroscope (IFOG) using birefringence modulation. The counter-propagating waves in the fiber optic loop of the IFOG are modulated with a slowly varying voltage signal, such as a triangle wave, ramp or sine wave signal, to cause birefringence modulation. A peak-to-peak amplitude of a resultant output signal is measured to determine the intensity-type PNR bias error of the IFOG.

The PNR bias error can be used for quality control purposes, or as a feedback signal to control the assembly process of the fiber optic loop.

BRIEF DESCRIPTION OF THE DRAWINGS

The accompanying drawings, which are incorporated in and form a part of this specification, illustrate embodiments of the invention and, together with the description, serve to in the principles of the invention:

FIG. 4 is a graph showing an input modulation signal according to the present invention.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for measuring an intensity-type polarization non-reciprocity (PNR) bias error in an interferometric fiber optic gyroscope (IFOG).

The present invention provides a method for quickly measuring an intensity type PNR error, using a technique called birefringence modulation ("Bi-mod"). Bi-mod modulates the primary optical mode (fast axis, zero order) of the IFOG interferometer by adding a triangle, ramp or sine wave modulation to the normal square wave modulation applied to the phase modulator. The bi-mod modulation frequency must be significantly less than the frequency of the normal square wave modulation. The type of modulation signal is not critical, as long as the signal is a slowly varying voltage signal, lacking sharp voltage transitions (which may cause spikes on the output). The result of the birefringence modulation is a sine wave output signal, whose peak-to-peak amplitude is a measure of the PNR bias error.

Figure 1:
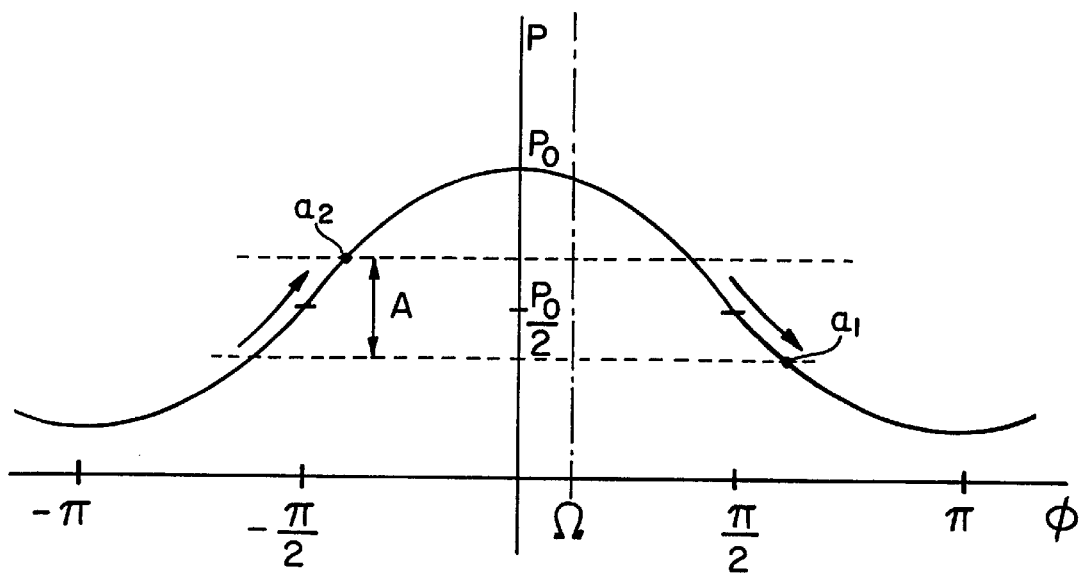
FIG. 1 is a graph illustrating how the Sagnac effect can be used to determine the rotation of a fiber loop.
Figure 2:
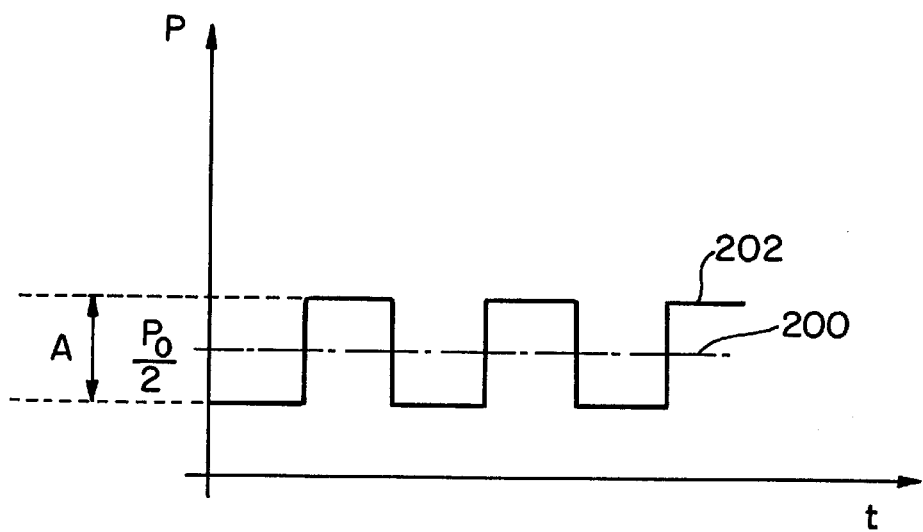
FIG. 2 graph showing an output power signal.
Figure 3A:
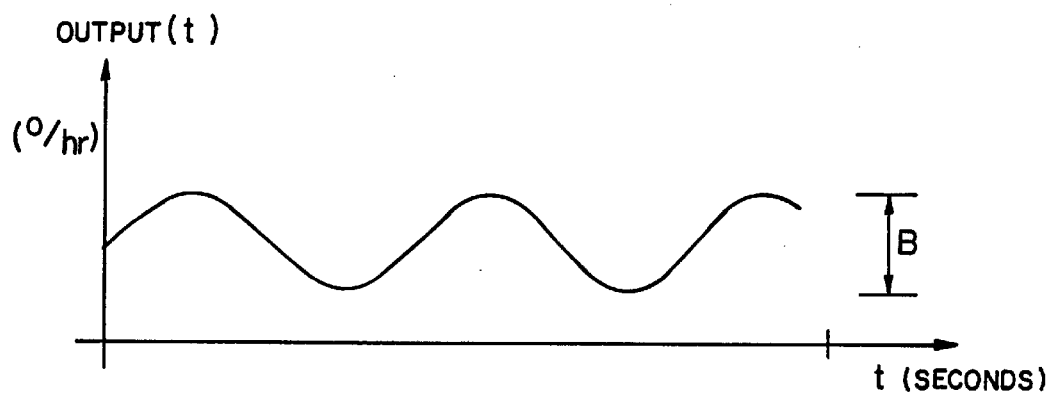
FIG. 3 is a graph showing an output signal formed according to the present invention.
Figure 3B:
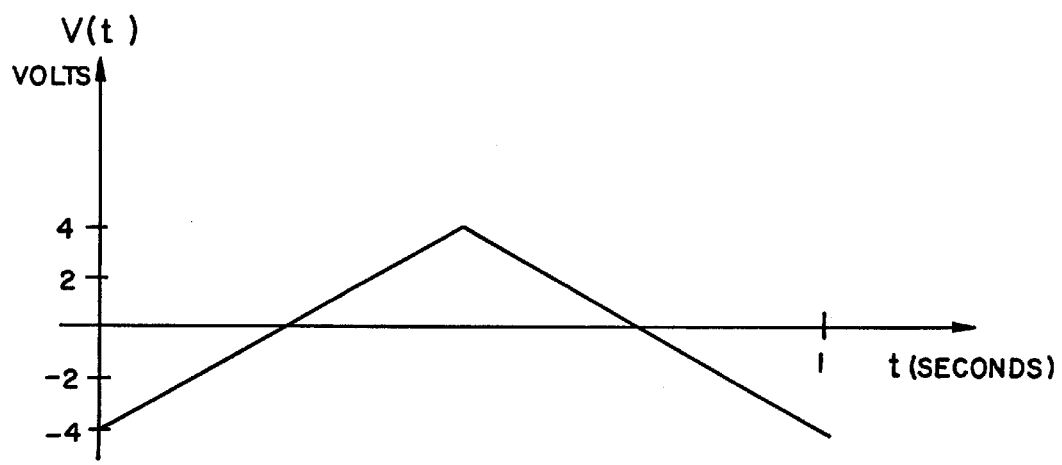

An example of a preferred modulation signal is illustrated in FIG. 4. A slowly varying triangle wave is used to modulate the counter-propagating light waves, in addition to the standard square wave signal. As a result of birefringence modulation, a sine wave signal shown in FIG. 3 is produced. The peak-to-peak amplitude B is a measure of the PNR bias error. If the voltage of the triangle wave changes by an amount corresponding to $2\pi$ radians of phase shift, then one complete cycle of the output sine wave is produced. There is no direct correlation between the periods of the triangle wave and the sine wave, however. In the preferred embodiment, the period of the triangle wave is typically one second. A 50–60 Hz signal could also be used so that the output signal may be measured using a standard A.C. voltmeter. The height of the ramp signal is not critical, but the distance should be at least one full cycle and the frequency should be much less than the period of the square wave signal (i.e. the period of the ramp function should be much greater than the period of the square wave signal).

The optimal amplitude of the modulation signal is equal to $2\pi$ radians of phase shift for the primary optical mode. The other modes are unmodulated or only partially modulated, which causes a change in the optical paths, and hence phase changes between the primary mode and the other modes. The changing phase of interference between the primary mode and the other modes produces PNR type bias error bias changes. Phase changes between the primary mode and other modes are also caused by temperature changes. PNR error, in fact, is normally observed as a temperature-dependent bias. The bi-mod technique allows for measurement of this bias error without the need to control and vary the temperature of the interferometer. The intensity type PNR bias error in the preferred embodiment is measured during several cycles of the modulation signal and any changes in the bias are scaled and reported as the PNR error.

One method for manufacturing IFOGs uses a robotic alignment station to align the fiber optic loop with a waveguide. In order to properly align the polarized fiber with the waveguide, the robot rotates the fiber ends relative to the waveguide to minimize an intensity measure. However, for higher accuracy, it is desirable to minimize the PNR bias error before the fiber ends are fixed in place. Thus, the measurement of the present invention can be used as a feedback to drive the alignment process to achieve the best (i.e. minimum PNR bias error) result. Moreover, since heating/cooling is not needed, and thermal expansion/contraction is not a factor, the measurement can be done during the actual alignment of the polarization axes of the fiber loop and the waveguides in a matter of minutes. The measurement may also be used as a process control or screening measure to ensure that the manufacturing process is operating within specification.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for measuring intensity-type polarization non-reciprocity (PNR) error in an interferometric fiber optic gyroscope (IFOG) having a fiber optic loop, the method comprising the steps of:

modulating light waves input to the fiber optic loop to cause birefringence modulation; and measuring a peak-to-peak amplitude of a resultant output signal produced by the birefringence modulation, wherein the peak-to-peak amplitude is a measure of the intensity-type PNR error.

2. The method of claim 1, wherein the step of modulating comprises modulating the light waves with a slowly varying voltage signal.

3. The method of claim 2, wherein the slowly varying voltage signal is a ramp function.

4. The method of claim 2, wherein the slowly varying voltage signal is a triangle wave signal.

5. The method of claim 2, wherein the resultant output signal is a sine wave.

6. The method of claim 5, wherein the slowly varying voltage signal is periodic.

7. The method of claim 6, wherein the period of the slowly varying voltage signal is longer relative to a period of a square wave signal used to modulate the light waves to determine a rate of rotation of the gyroscope.

8. The method of claim 7, wherein the period of the slowly varying voltage signal is 1 cycle per second.

9. The method of claim 7, wherein the period of the slowly varying voltage signal is 50–60 cycles per second.

10. The method of claim 6, wherein the period of the slowly varying voltage signal is longer than a full period of the resultant output signal.

11. A method for measuring intensity-type polarization non-reciprocity (PNR) error in an interferometric fiber optic gyroscope (IFOG), the IFOG having a fiber optic loop injected with counter-propagating light waves modulated by a square wave signal, the method comprising the steps of:

modulating the counter-propagating light waves input to the fiber optic loop to cause birefringence modulation; and measuring a peak-to-peak amplitude of a resultant output signal produced by the birefringence modulation, wherein the peak-to-peak amplitude is a measure of the intensity-type PNR error.

12. The method of claim 11, wherein the step of modulating comprises modulating the light waves with a slowly varying voltage signal.

13. The method of claim 12, wherein the slowly varying voltage signal is a ramp function.

14. The method of claim 12, wherein the slowly varying voltage signal is a triangle wave signal.

15. The method of claim 12, wherein the resultant output signal is a sine wave.

16. The method of claim 15, wherein the slowly varying voltage signal is periodic.

17. The method of claim 16, wherein the period of the slowly varying voltage signal is longer relative to a period of the square wave signal.

18. A method for measuring intensity-type polarization non-reciprocity (PNR) error in an interferometric fiber optic gyroscope (IFOG), the IFOG having a fiber optic loop injected with counter-propagating light waves modulated by a square wave signal, the method comprising the steps of:

modulating the counter-propagating light waves input to the fiber optic loop with a triangle wave signal having a longer period relative to the period of the square wave signal; and measuring a peak-to-peak amplitude of a resultant output sine wave signal, wherein the peak-to-peak amplitude is a measure of the intensity-type PNR error.

19. The method of claim 18, wherein the period of the triangle wave signal is longer than a full period of the resultant output sine wave signal.

* * * * *